Jan. 3, 1967   W. E. GERBER   3,295,519
MOUTH EXERCISER
Filed Oct. 13, 1964

Inventor
Warren E. Gerber

By

Prangley Baird Clayton Miller & Vogel
Attys.

3,295,519
MOUTH EXERCISER
Warren E. Gerber, 64 Old Orchard Road,
Skokie, Ill. 60609
Filed Oct. 13, 1964, Ser. No. 403,466
7 Claims. (Cl. 128—136)

This invention relates to an orthodontic mouth exerciser for juveniles in the age group from about three to fourteen years.

It has been found that orthodontic problems in juveniles are associated with the creation in infancy of reversed or deviated swallowing patterns, which are evidenced by the thrusting of the tongue forward during swallowing and by other improper use patterns, developed during infancy. It is accordingly an object of this invention to provide mouth exercisers for juveniles within the age group of about three to fourteen years and which will correct for or eliminate habitual improper use of the tongue and train the muscles used in swallowing so as to assume or develop a normal pattern of swallowing thereby eliminating those dental malocclusions and misalignments occasioned by the prior habitual improper use of the tongue.

A juvenile whose teeth have been properly aligned will all too often suffer a relapse in which the teeth return wholly or partially to their original deformed condition. It is believed that such relapses are largely caused by mouth breathing habits; by weak and flaccid orbicularis oris and buccinator muscles and by mouth muscle imbalance. It is occordingly a further object of the invention to provide means for correcting or eliminating mouth breathing in juveniles where not required by blocked nasal passages, and to strengthen those weak and flaccid lip and cheek muscles so that such relapse will will not occur.

Juveniles, particularly in the younger ages, still frequently evidence habitual sucking of the fingers and thumbs and of other external or foreign objects which create or worsen orthodontic problems and impede the orthodontist's work. It is accordingly a further object of the invention to provide orthodontic devices adapted to be wholly confined within the mouth and so designed that the prescribed use over a period of time will correct or eliminate such sucking habits and eliminate the orthodontic problems created thereby.

The tone of investing tissues surrounding the teeth of today's juveniles is frequently poor, leading to pyorrhea, gum shrinkage, loose teeth and other dental problems in the old age groups and in young adults. It is accordingly a still further object of the invention to provide an orthodontic exercising device which will stimulate the circulation of blood through the gums, improve the tone of the investing tissues and counteract the conditions which tend to create such dental problems.

It has been previously suggested that the improper exercising of the mouth and jaw muscles during infancy might be minimized by the use of orthodontic nipples and pacifiers compelling proper use of the infant's mouth and jaw muscles. However, juveniles with orthodontic problems cannot be persuaded to use such nipples and pacifiers, nor in many cases, would such devices be effective for juveniles. It is, therefore, an important object of this invention to provide an orthodontic mouth exerciser which will commend itself to juveniles and which is designed to compel, by its use, proper exercising of the mouth and jaw muscles.

The above and other objects and advantages of this invention will be apparent from the following description when taken in connection with the accompanying drawing in which.

Figure 1:
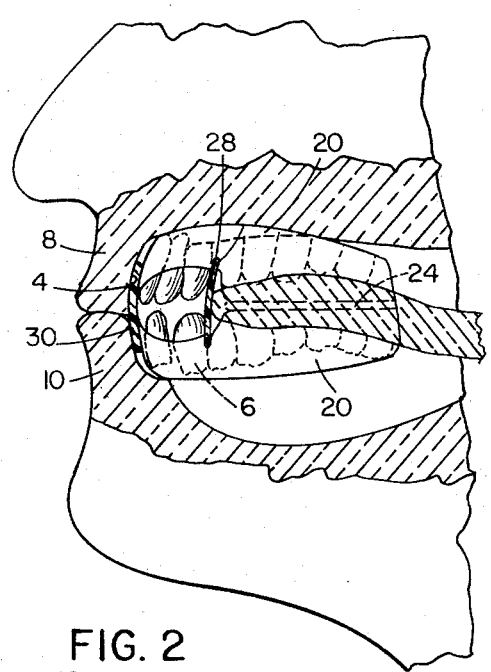
FIGURE 1 is a view in elevation and partly in section illustrating the manner and use and placement of an orthodontic mouth exerciser constructed in accordance with the present invention.
Figure 3:
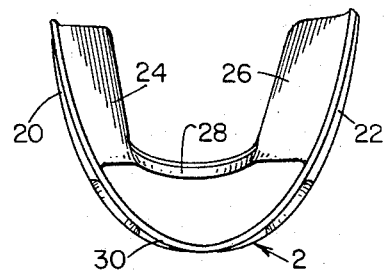
FIGURE 3 is a plan view of said device.
Figure 4:
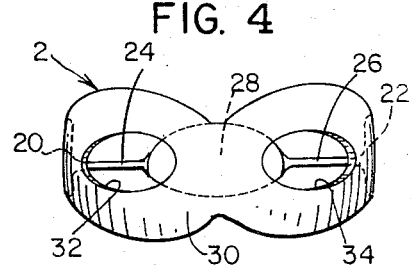
FIGURE 4 is a view in rear elevation of the device.
Figure 2:
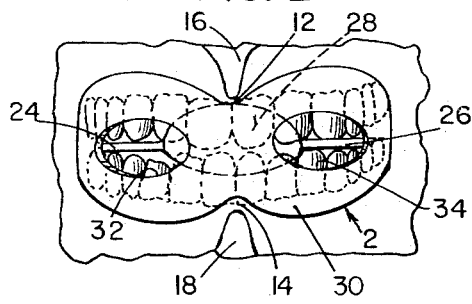
FIGURE 2 is a fragmentary view in front elevation illustrating also the manner of use or placement of the device.

Referring specifically to the drawing, a preferred form of an orthodontic mouth exerciser embodying the invention comprises a shield 2 preferably made of a thermoplastic material such as a silicone rubber, and which is concave-convex in form, both vertically and horizontally, and proportioned, according to age classes, to occupy, both vertically and horizontally substantially the entire vestibule area 4 between the patient's teeth 6 and the patient's upper and lower lips 8 and 10 so that it may most comfortably be held in the mouth and the mouth will be necessarily fully, or substantially fully, closed when the shield is placed in the vestibule area. The plastic shield 2 is provided in its central, vertical plane with upper and lower rounded grooves 12 and 14 to receive the labia frenulum 16 and 18 uniting the upper and lower lips to the corresponding gums so that the patient's lips 8 and 10 may be comfortably retained in closed, or nearly closed, position during use while the shield 2 bears against the upper and lower front teeth and gums.

The shield 2 is formed with integral rearwardly extending wing portions 20 and 22 to extend rearwardly of the mouth for engagement with the outer surfaces of the upper and lower side teeth, as shown in FIGURE 1, these wing portions having substantially flat outer surfaces for comfortable fitting within the mouth and to anchor the device against lateral movement.

Figure 5:
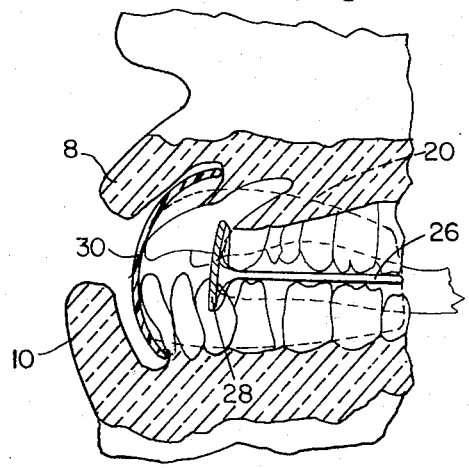
FIGURE 5 is a view in elevation and partly in section illustrating the manner and use and placement of the device by a patient having an anterior open-bite.

The shield 2 is also provided with bite strips 24 and 26, preferably formed integrally with the wing portions 20 and 22 and extending inwardly from those wing portions for gripping between the posterior upper and lower teeth, as shown most clearly in FIGURE 5 and to anchor the device longitudinally.

The bite strips 24 and 26 are joined by an integral tongue shield or stop 28 in rearwardly spaced relation to the front, tooth-engaging, portion 30 of the shield 2, the tongue shield 28 being of sufficient vertical height, both above and below the biting strips 24 and 26, to prevent pressing of the tongue into the forward part of the mouth cavity and thereby preventing the tongue from applying forward pressure to the front teeth.

In instances of gross malocclusions, as illustrated in FIGURE 5, the shield 2 may readily, on application of heat be bent, both vertically and horizontally, to conform to the various anteriorposterior deficiencies of the malocclusions so as to bear upon a desired number of the upper and lower front teeth and yet be comfortably received in the mouth vestibule. The shield 2 is also preferably provided with openings 32 and 34 on opposite sides of the vertical plane of the shield so that in cases where normal breathing through the nose is prevented by blocked nasal passages, the openings 32 and 34 will provide air passages through the shield for mouth breathing.

It is contemplated that the orthodontist may prescribe, or provide, these orthodontic devices for use, usually under periodic supervision for a sufficient length of time, to accomplish the desired purposes.

In use the closure of the patient's lips so far as possible, over the front end of the shield applies an orthodontically desirable inward force to the shield and through the shield to the misaligned front teeth engaged by the shield. At the same time the closure of the mouth about the side wings 20 and 22 applies an orthodontically desirable lateral force to the shield and through the shield to any misaligned posterior upper and lower teeth. The bite strips 24 and 26 provide very simple and comfortable means for juvenile to hold the shield in his mouth and the gripping of the bite strips by the teeth cause the mouth to close over the shield.

The tongue shield or stop 28 prevents outward pressures by the tongue on the misaligned front teeth and thereby prevents the tongue from being used in such manner as to counteract the orthodonically desirable inward forces applied to the front teeth by the front portion of the shield.

The device of this invention overcomes the orthodonic problems of habitual thumb suckers since the thumb cannot be introduced into the mouth while the device is in use. The thumb sucking habit is thereby overcome without creating psychological problems which are so often created by the use of other methods of combatting the thumb sucking habits of the young juveniles.

The device of this invention also impels the user to breathe through his nose, if possible, and the habitual or prescribed use of these devices eliminates the mouth breathing habit so harmful to the development of the proper mouth musculatures.

The details of the device disclosed herein are not to be taken as limitations upon the invention but as illustrations of a preferred embodiment in which variations may be made without departing from the invention as set forth in the attached claims.

What I claim is:

1. An orthodontic mouth exerciser for juveniles comprising a shield having a rear surface for engaging the outer surfaces of the upper and lower front teeth and gums of a patient when placed into the mouth vestibule and a front surface shaped to fit the lips when the lips are closed over the shield, said shield also including side portions integral with said front portion and extending rearwardly therefrom to overlie the outer surfaces of the posterior upper and lower teeth, and bite means integral with and extending inwardly from each of the side portions for gripping between the posterior upper and lower teeth.

2. An orthodontic mouth exerciser as set forth in claim 1 wherein the front portion of the shield is formed with rounded grooves centrally of the upper and lower margins of the shield for receiving the upper and lower labia frenulum.

3. An orthodontic mouth exerciser as set forth in claim 1 and including a tongue shield formed integrally with the bite means and spaced rearwardly from the front portion of the shield to prevent application of forward forces to the front teeth by means of the patient's tongue.

4. An orthodontic mouth exerciser as set forth in claim 1 wherein the side portions of the shield are provided with substantially flat outer surfaces.

5. An orthodontic mouth exerciser for juveniles comprising a shield having a rear surface for engaging the front teeth and gums of a patient when placed into the mouth vestibule and a front surface shaped to fit the lips when the lips are closed over the shield, said shield also including side portions integral with said front portion and extending rearwardly therefrom, and bite means integral with and extending inwardly from each of the side portions for gripping between the posterior upper and lower teeth, the front portion of said shield being provided with a front surface which is convex and a rear surface which is concave in both vertical and horizontal directions for conformance to the shape of the internal surfaces of the lips and the external surfaces of the upper and lower front teeth.

6. An orthodontic mouth exerciser for juveniles comprising a shield having a rear surface for engaging the front teeth and gums of a patient when placed into the mouth vestibule and a front surface shaped to fit the lips when the lips are closed over the shield, said shield also including side portions integral with said front portion and extending rearwardly therefrom, and bite means integral with and extending inwardly from each of the side portions for gripping between the posterior upper and lower teeth, the front portion of the shield being provided with spaced openings on opposite sides of the vertical center thereof for providing mouth breathing passages through the shield.

7. An orthodontic mouth exerciser for juveniles comprising a shield having a rear surface for engaging the front teeth and gums of a patient when placed into the mouth vestibule and a front surface shaped to fit the lips when the lips are closed over the shield, said shield also including side portions integral with said front portion and extending rearwardly therefrom, and bite means integral with and extending inwardly from each of the side portions for gripping between the posterior upper and lower teeth, said shield being made of thermoplastic material deformable on application of heat to conform the shield to the mouth occluded form of the teeth.

References Cited by the Examiner
UNITED STATES PATENTS

| | | | |
|---|---|---|---|
| 1,302,004 | 4/1919 | Brown | 128—136 |
| 2,847,003 | 8/1958 | Helmer et al. | 128—136 |

ADELE M. EAGER, *Primary Examiner.*